United States Patent [19]
Smith et al.

[11] Patent Number: 5,720,128
[45] Date of Patent: Feb. 24, 1998

[54] LANDSCAPE EDGING SYSTEM

[76] Inventors: David A. Smith; Thelma E. Smith, both of Box 460, Lone Tree, Iowa 52755

[21] Appl. No.: 492,378

[22] Filed: Jun. 19, 1995

[51] Int. Cl.$^6$ ........................................ A01G 1/00
[52] U.S. Cl. ........................... 47/33; 52/102; 404/7
[58] Field of Search ........................ 47/33; 404/6, 7, 404/8; 52/102

[56] References Cited

U.S. PATENT DOCUMENTS

| | | | |
|---|---|---|---|
| 352,146 | 11/1886 | Oungst | 47/33 |
| 2,877,600 | 3/1959 | Slate | 47/33 |
| 3,788,001 | 1/1974 | Balfanz, Jr. | 47/33 |
| 5,259,154 | 11/1993 | Lilley | 47/33 |
| 5,377,447 | 1/1995 | Fritch | 47/33 |
| 5,414,956 | 5/1995 | Kheradpir | 47/33 |

FOREIGN PATENT DOCUMENTS

| | | | |
|---|---|---|---|
| 18225 | 2/1929 | Australia | 47/33 |

*Primary Examiner*—Terry Lee Melius
*Assistant Examiner*—Joanne C. Downs

[57] ABSTRACT

An edging system for separating grass of a lawn from landscaping features thereof. The inventive device includes a plurality of linear members and a plurality of corner members which can be interconnected into a desired orientation. The members each include a vertical plate positionable into the lawn, and a horizontal plate projecting from an interior of the vertical plate which limits insertion of the vertical plate and maintains the same in a vertical orientation.

3 Claims, 3 Drawing Sheets

5,720,128

1
LANDSCAPE EDGING SYSTEM

BACKGROUND OF THE INVENTION

1. Field of the Invention

The present invention relates to yard landscaping devices and more particularly pertains to a landscape edging system for separating grass of a lawn from landscaping features thereof.

2. Description of the Prior Art

The use of yard landscaping devices is known in the prior art. More specifically, yard landscaping devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art yard landscaping devices include U.S. Pat. Nos. 5,067,273; 4,601,140; 4,074,479; 3,788,001; and 3,545,128.

While these devices fulfill their respective, particular objectives and requirements, the aforementioned patents do not disclose a landscape edging system for separating grass of a lawn from landscaping features thereof which includes a plurality of linear members and a plurality of corner members which can be interconnected into a desired orientation, wherein the members each include a vertical plate positionable into the lawn and a horizontal plate projecting from an interior of the vertical plate which limits insertion of the vertical plate and maintains the same in a vertical orientation relative to the lawn.

In these respects, the landscape edging system according to the present invention substantially departs from the conventional concepts and designs of the prior art, and in so doing provides an apparatus primarily developed for the purpose of separating grass of a lawn from landscaping features.

SUMMARY OF THE INVENTION

In view of the foregoing disadvantages inherent in the known types of yard landscaping devices now present in the prior art, the present invention provides a new landscape edging system construction wherein the same can be utilized for separating grass of a lawn from landscaping features thereof. As such, the general purpose of the present invention, which will be described subsequently in greater detail, is to provide a new landscape edging system apparatus and method which has many of the advantages of the yard landscaping devices mentioned heretofore and many novel features that result in a landscape edging system which is not anticipated, rendered obvious, suggested, or even implied by any of the prior art yard landscaping devices, either alone or in any combination thereof.

To attain this, the present invention generally comprises an edging system for separating grass of a lawn from landscaping features thereof. The inventive device includes a plurality of linear members and a plurality of corner members which can be interconnected into a desired orientation. The members each include a vertical plate positionable into the lawn, and a horizontal plate projecting from an interior of the vertical plate which limits insertion of the vertical plate and maintains the same in a vertical orientation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new landscape edging system apparatus and method which has many of the advantages of the yard landscaping devices mentioned heretofore and many novel features that result in a landscape edging system which is not anticipated, rendered obvious, suggested, or even implied by any of the prior art yard landscaping devices, either alone or in any combination thereof.

It is another object of the present invention to provide a new landscape edging system which may be easily and efficiently manufactured and marketed.

It is a further object of the present invention to provide a new landscape edging system which is of a durable and reliable construction.

An even further object of the present invention is to provide a new landscape edging system which is susceptible of a low cost of manufacture with regard to both materials and labor, and which accordingly is then susceptible of low prices of sale to the consuming public, thereby making such landscape edging systems economically available to the buying public.

Still yet another object of the present invention is to provide a new landscape edging system which provides in the apparatuses and methods of the prior art some of the advantages thereof, while simultaneously overcoming some of the disadvantages normally associated therewith.

Still another object of the present invention is to provide a new landscape edging system for separating grass of a lawn from landscaping features thereof.

Yet another object of the present invention is to provide a new landscape edging system which includes a plurality of linear members and a plurality of corner members which can be interconnected into a desired orientation, wherein the members each include a vertical plate positionable into the lawn and a horizontal plate projecting from an interior of the vertical plate which limits insertion of the vertical plate and maintains the same in a vertical orientation relative to the lawn.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
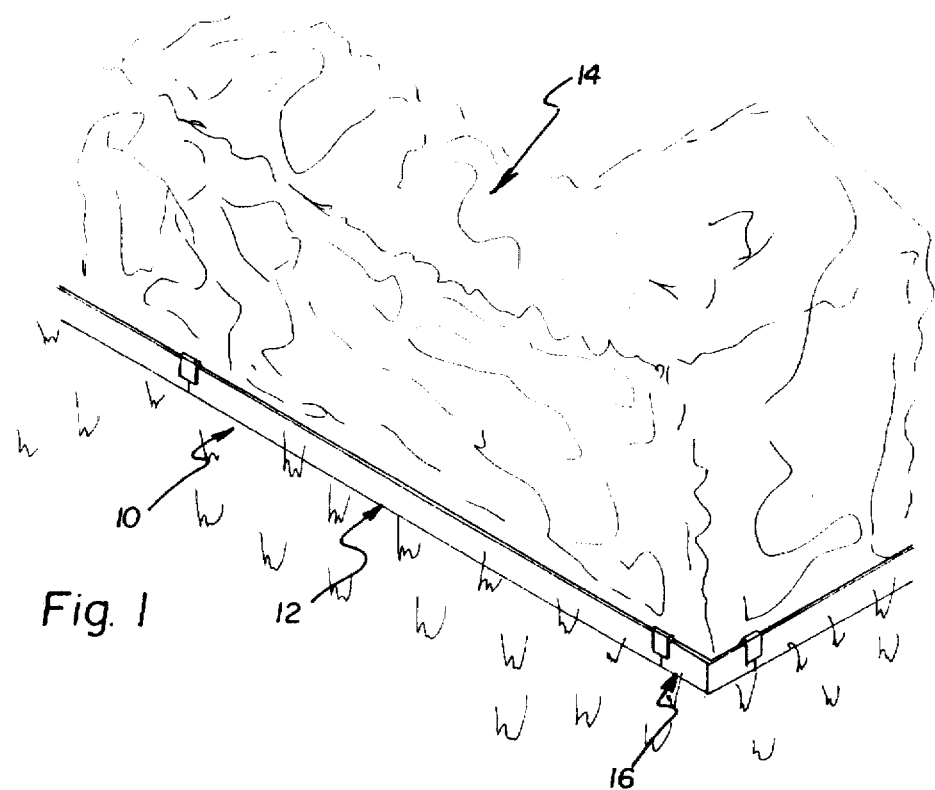
FIG. 1 is an isometric illustration of a landscape edging system according to the present invention in use.
Figure 2:
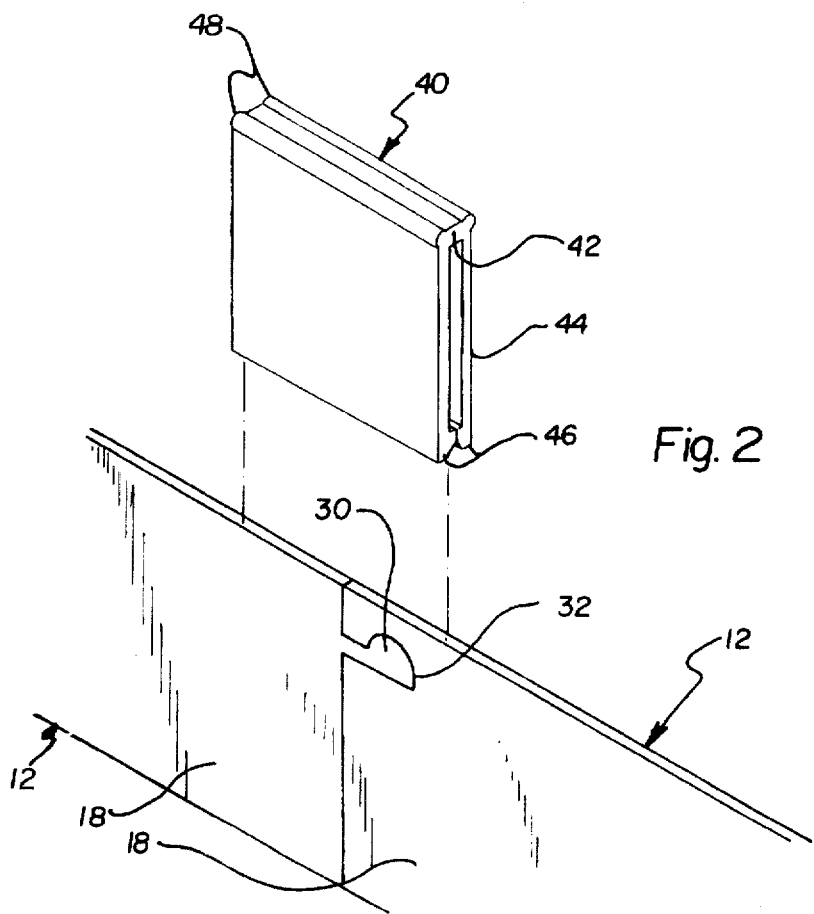
FIG. 2 is an exploded isometric illustration of a portion of the present invention.

With reference now to the drawings, and in particular to FIGS. 1-6 thereof, a new landscape edging system embodying the principles and concepts of the present invention and generally designated by the reference numeral 10 will be described.

More specifically, it will be noted that the landscape edging system 10 comprises at least one and preferably a plurality of linear members 12 adapted for piercing engagement with a ground surface and positionable between grass of a lawn and a landscaping feature thereof such as the shrub 14 illustrated in FIG. 1 of the drawings. At least one and preferably a plurality of corner members 16 are provided with the present invention 10 and are each similarly adapted for insertion into the ground surface of the lawn. The corner members 16 are further adapted for coupling to adjacent and orthogonally oriented linear members 12 substantially as shown in FIG. 1 of the drawings. By this structure, the landscape edging system 10 can be utilized to separate a landscaping feature such as the shrub 14 from adjacent grass so as to reduce a need for trimming of the grass from immediately adjacent to the landscaping feature or shrub.

Figure 3:
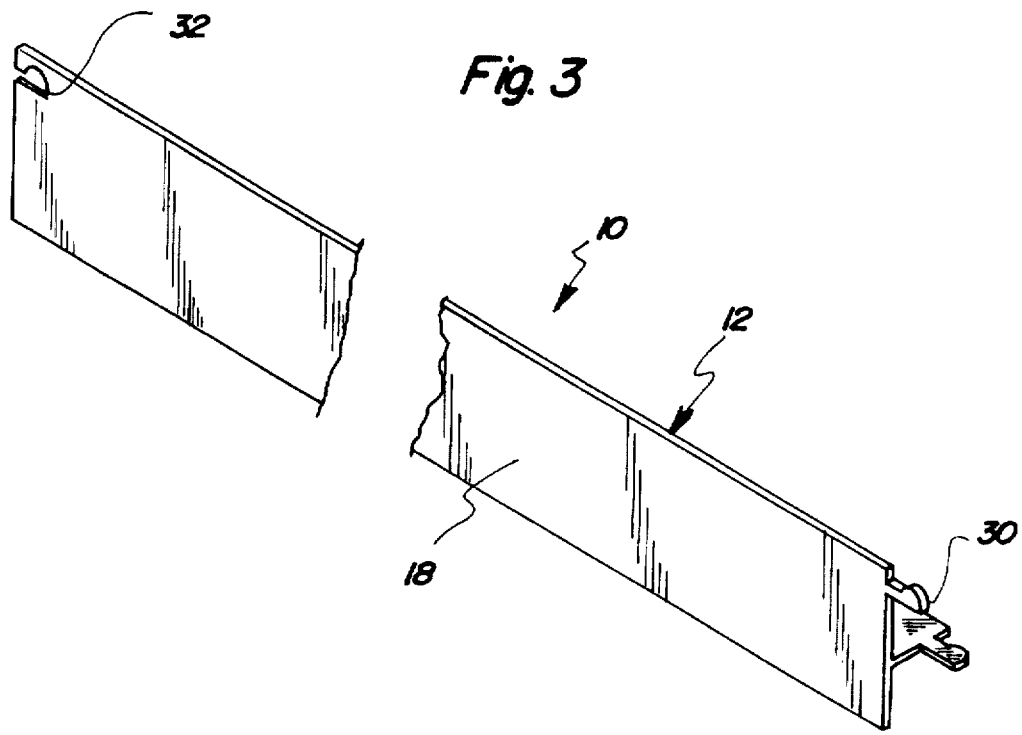
FIG. 3 is a front isometric illustration of an individual linear member of the invention.
Figure 4:
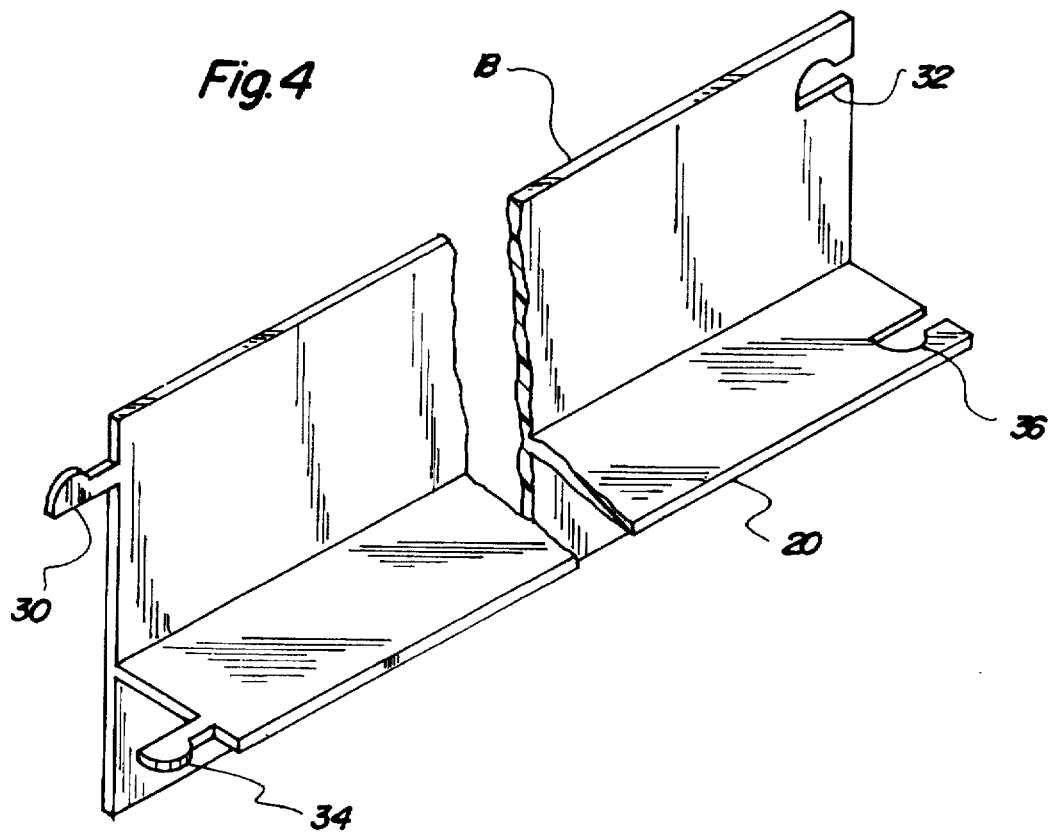
FIG. 4 is a rear isometric illustration of the linear member.

Referring now to FIGS. 3 and 4 of the drawings, it can be shown that the linear members 12 of the present invention 10 preferably each comprise an elongated vertical plate 18 having a lower longitudinal edge which can be forcibly inserted into a ground surface of the associated lawn. A horizontal plate 20 projects from an interior surface of the vertical plate 18 and is oriented so as to extend substantially orthogonally relative thereto. The horizontal plate 20 is spaced from the lower longitudinal edge of the vertical plate 18 so as to limit insertion of the linear member 12 into the ground surface, and further to maintain the vertical plate 18 in a substantially vertical orientation relative to the ground surface.

Figure 5:
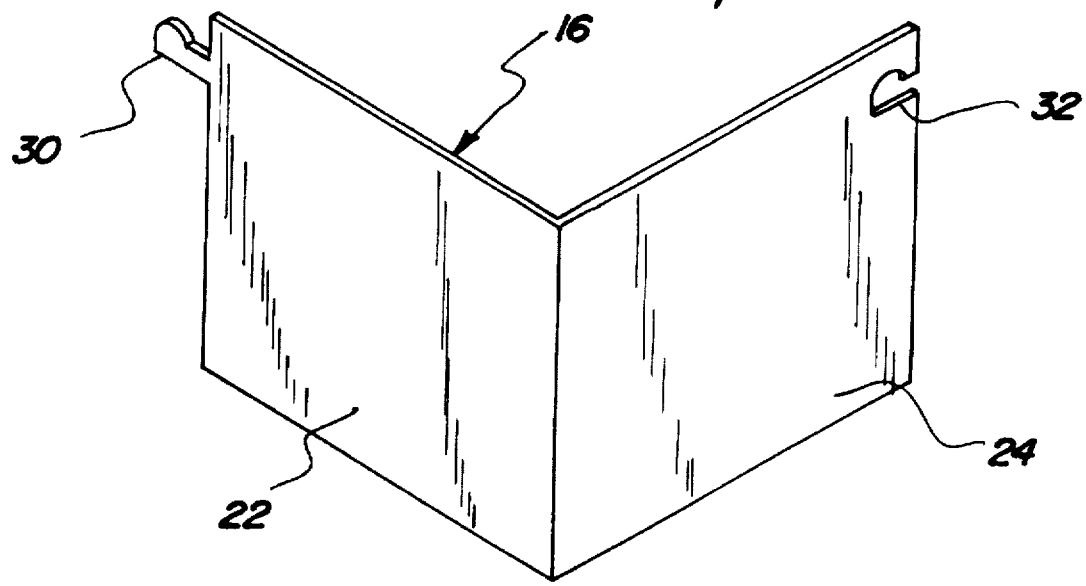
FIG. 5 is a front isometric illustration of an individual corner member of the invention.
Figure 6:
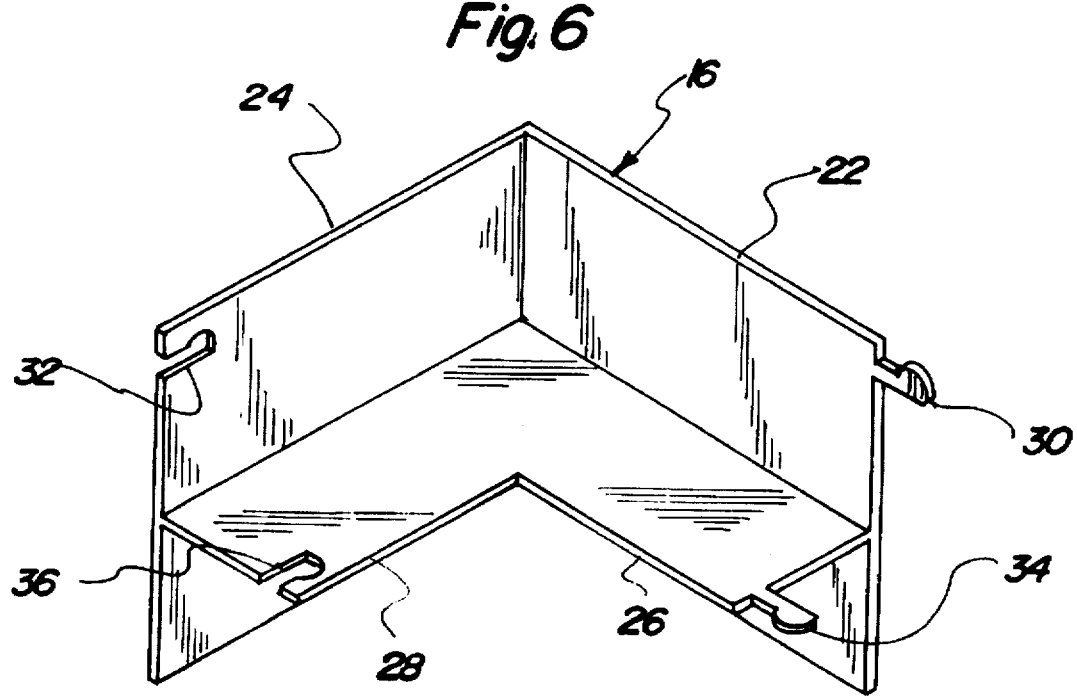
FIG. 6 is a rear isometric illustration of the corner member.

As shown in FIGS. 5 and 6, the corner members 16 are similarly comprised relative to the linear members 12 and each include a first corner vertical plate 22 orthogonally coupled to a second corner vertical plate 24. A first corner horizontal plate 26 projects substantially orthogonally from an interior surface of the first corner vertical plate 22 and may be integrally formed with a second corner horizontal plate 28 similarly projecting substantially orthogonally from an interior surface of the second corner vertical plate 24. The corner horizontal plates 26 and 28, in a manner similar to that of the horizontal plate 20 of the linear member 12, operate to limit insertion of the corner vertical plates 22 and 24 into the ground surface and further operate to maintain the vertical plates in a substantially vertical orientation projecting from the ground surface.

Referring again to FIGS. 3 through 6, it can be shown that the vertical plates 18 and 22 each include a vertical plate securing projection 30 extending therefrom. Further, the vertical plates 18 and 24 are shaped so as to define a vertical plate securing aperture 32 directed therethrough which cooperatively receives the vertical plate securing projection 30 of an adjacent component of the device 10 so as to removably couple the linear members 12 to one another and/or to the corner members 16 as desired by an end user. Further, the present invention 10 may further include horizontal plate securing projections 34 projecting from the horizontal plates 20 and 26 which can be cooperatively received within horizontal plate securing apertures 36 formed in the horizontal plates 20 and 28.

To further secure the coupled linear members 12, or alternatively a coupled linear member and corner member 16 together, the present invention 10 may further comprise a plurality of couplers 40 which can be positioned over the vertical plates 18, 22, and 24, of adjacent components of the invention. The couplers 40 each comprise a transverse member 42 having a pair of substantially spaced and parallel gripping plates 44 projecting therefrom. The gripping plates 44 each terminate in an enlarged lower end 46 which frictionally engages exterior surfaces of the vertical plates 18, 22, and 24. To facilitate ease of manual manipulation of the couplers 40, each of the couplers includes spaced and substantially parallel longitudinal gripping projections 48 extending along opposed longitudinal edges of the transverse member 42. By this structure, a positioning of one of the couplers 40 over adjacent vertical plates 18, 22, or 24 will operate to maintain the vertical plate securing projection 30 within the respective vertical plate securing aperture 32. Further, it is contemplated that the coupler 40 can also be positioned over adjacent horizontal plates 20, 26, or 28 so as to further secure the horizontal plate securing projection 34 within the respective horizontal plate securing aperture 36.

In use, the landscape edging system 10 of the present invention can be easily utilized for separating grass of a lawn from landscaping features thereof. The present invention 10 is configured for easy insertion into an associated ground surface and its modular design allows the device 10 to be custom installed about any desired landscaping feature. The present invention 10 is preferably constructed entirely of plastic or polymeric materials which will not rust or corrode when exposed to the elements.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A landscape edging system comprising:

a plurality of linear members adapted for piercing engagement with a ground surface each comprising an elongated vertical plate having a lower longitudinal edge adapted to be forcibly inserted into a ground surface; and a horizontal plate projecting from an interior surface of the vertical plate, the horizontal plate being oriented so as to extend substantially orthogonally from the vertical plate to maintain the vertical plate in a substantially vertical orientation projecting orthogonally from the ground surface when positioned thereinto, the linear members each having opposed ends and being couplable together at adjacent ends thereof to secure the linear members together in a colinear orientation, the vertical plates of the linear members each including a vertical plate securing projection extending from a first end thereof, with a second end of each of the vertical plates being shaped so as to define a vertical plate securing aperture directed therethrough which cooperatively receives the vertical plate securing projection of an adjacent linear member so as to removable couple the linear members together, each horizontal plate being spaced from the lower longitudinal edge of the vertical plate so as to limit insertion of the linear member into the ground surface, the horizontal plates of the linear members each including a horizontal plate securing projection extending from a first end thereof, with a second end of each of the horizontal plates being shaped so as to define a horizontal plate securing aperture directed therethrough which cooperatively receives the horizontal plate securing projection of an adjacent member so as to removably couple the linear members together; and a plurality of couplers positionable over the vertical plates of adjacent linear members, the couplers each comprising a transverse member having a pair of substantially spaced and parallel gripping plates projecting therefrom, the gripping plates each terminating in an enlarged lower end which frictionally engages exterior surfaces of the vertical plates, and further each of the couplers includes spaced and substantially parallel longitudinal gripping projections extending along opposed longitudinal edges of the transverse member.

2. A landscape edging system comprising:

a linear member adapted for piercing engagement with a ground surface, the linear member comprising an elongated vertical plate having a lower longitudinal edge adapted to be forcibly inserted into a ground surface; a horizontal plate projecting from an interior surface of the vertical plate, the horizontal plate being spaced from the lower longitudinal edge of the vertical plate so as to limit insertion of the linear member into the ground surface, the horizontal plate being oriented so as to extend substantially orthogonally from the vertical plate to maintain the vertical plate in a substantially vertical orientation projecting orthogonally from the ground surface when positioned thereinto, the vertical plate of the linear member including a vertical plate securing projection extending from a first end thereof, with a second end of the vertical plate including a vertical plate securing aperture directed therethrough;

a corner member adapted for piercing engagement with a ground surface, the corner member comprising a first corner vertical plate; a second corner vertical plate, with the first corner vertical plate being orthogonally coupled to the second corner vertical plate; a first corner horizontal plate protecting from an interior surface of the first corner vertical plate; and a second corner horizontal plate protecting from an interior surface of the second corner vertical plate, the corner horizontal plates each being oriented so as to extend substantially orthogonally from the respective corner vertical plate to maintain the respective corner vertical plate in a substantially vertical orientation projecting orthogonally from the ground surface when positioned thereinto, the horizontal plate of the linear member including a horizontal plate securing projection extending from a first end thereof, with a second end of the horizontal plate being shaped so as to define a horizontal plate securing aperture directed therethrough; and further wherein the first corner horizontal plate of the corner member includes a horizontal plate securing projection extending therefrom, with the second corner horizontal plate of the corner member being shaped so as to define a horizontal plate securing aperture directed therethrough which cooperatively receives the horizontal plate securing projection of the linear member so as to removable couple the members together, the first corner vertical plate of the corner member including a vertical plate securing projection extending therefrom, with the second corner vertical plate of the corner member being shaped so as to define a vertical plate securing aperture directed therethrough, with the vertical plate securing projection of the linear member being positioned within the vertical plate securing aperture of the second corner vertical plate of the corner member so as to removably couple the members together; and a coupler positioned over the vertical plate of the linear member and the corner member, wherein the coupler comprises a transverse member having a pair of substantially spaced and parallel gripping plates projecting therefrom, the gripping plates each terminating in an enlarged lower end which frictionally engages an exterior surface of the vertical plates, and wherein the coupler includes spaced and substantially parallel longitudinal gripping projections extending along opposed longitudinal edges of the transverse member.

3. A landscape edging system comprising:

a plurality of corner members adapted for piercing engagement with a ground surface, each corner member comprising a first corner vertical plate;

a second corner vertical plate with the first corner vertical plate being orthogonally coupled to the second corner vertical plate;

a first corner horizontal plate projecting from an interior surface of the first corner vertical plate; and a second corner horizontal plate projecting from an interior surface of the second corner vertical plate;

the corner horizontal plates being each being oriented so as to extend substantially orthogonally from the respective corner vertical plate to maintain the respective corner vertical plate in a substantially vertical orientation projecting orthogonally from the ground surface when positioned thereinto, the first corner vertical plate of each of the corner members including a vertical plate securing projection extending therefrom, with the second corner vertical plate of each of the corner members being shaped so as to define a vertical plate securing aperture directed therethrough which cooperatively receives the vertical plate securing projection of an adjacent corner member so as to removable couple the members together, the first corner horizontal plate of each of the corner members including a horizontal plate securing projection extending therefrom, with the second corner horizontal plate of each of the corner members being shaped so as to define a horizontal plate securing aperture directed therethrough which cooperatively receives the horizontal plate securing projection of an adjacent corner member so as to removably couple the members together; and a plurality of couplers positionable over the vertical plates of adjacent corner members, the couplers each comprising a transverse member having a pair of substantially spaced and parallel gripping plates projecting therefrom, the gripping plates each terminating in an enlarged lower end which frictionally engages exterior surfaces of the vertical plates, and further each of the couplers including spaced and substantially parallel longitudinal gripping projections extending along opposed longitudinal edges of the transverse member.

* * * * *